United States Patent [19]
Shimomura

[11] Patent Number: 5,854,925
[45] Date of Patent: Dec. 29, 1998

[54] AUTOMATIC BUG LOCATOR FOR AUTOMATICALLY LOCATING BUGS THROUGH INTERACTION WITH AN OPERATOR

[75] Inventor: Takao Shimomura, Tokushima, Japan

[73] Assignee: ATR Communication Systems Research Laboratories, Kyoto, Japan

[21] Appl. No.: 781,796

[22] Filed: Jan. 10, 1997

[30]     Foreign Application Priority Data

May 17, 1996  [JP]  Japan .................................. 8-123086

[51] Int. Cl.$^6$ ........................................................ G06F 9/45
[52] U.S. Cl. ..................................... 395/704; 395/183.14
[58] Field of Search .............................. 395/568, 183.14, 395/704

[56]                References Cited

U.S. PATENT DOCUMENTS 5,161,216  11/1992  Reps et al. ............................... 395/704

OTHER PUBLICATIONS

Shimomura, T.: "Critical–Slice Based Bug–Locating Strategy in Variable Value Errors", IPS Japan, vol. 33, No. 4, Apr. 1992.

Lyle, J.R., et al: "Automatic Program Bug Location by Program Slicing", pp. 877–883.

Agrawal, H., et al: "Debugging with Dynamic Slicing and Backtracking", Dec. 1, 1992.

*Primary Examiner*—Parshotam S. Lall
*Assistant Examiner*—Kenneth R. Coulter
*Attorney, Agent, or Firm*—Lowe, Price, LeBlanc & Becker

[57]                ABSTRACT

A program is rerun up to an abnormal point. In this situation, a control flow at a division point between a normal point and the abnormal point is derived while a variable influencing the error and the value of the variable at the division point are derived on the basis of four dependences. A programmer determines an error of the control flow, an error of the value of the variable influencing the error, and an error of a value of a variable used in a conditional instruction/loop instruction. Such processing is repeated, so that an instruction finally remaining between the normal and abnormal points is determined to be a bug. If no instruction having a dependence on the abnormal point is present between the normal and abnormal points, a determination is made that a bug related to omission of an instruction is present between the normal and abnormal points. Thus, the bug is automatically located through interaction with the programmer, whereby program debugging can be simplified as compared with dynamic slicing and static slicing.

1 Claim, 16 Drawing Sheets

FIG. 8

```
1  /* Find the sum of areas of given triangles. */
2  #define MAX 100
3  typedef enum {isosceles, equilateral, right, scalene} class_type;
4  typedef struct {int a, b, c;} triangle_type;
5
6  main()
7  {
8          triangle_type sides[MAX];
9          class_type class;
10         int a_sqr,b_sqr, c_sqr, N, i;
11         double area, sum, s, sqrt();
12
13         printf("Enter number of triangles:\n");
14         scanf("%d", &N);
15         for (i=0; i<N; i++) {
16                 printf("Enter three sides of triangle %d in ascending order:\n", i+1);
17                 scanf("%d %d %d", &sides[i].a, &sides[i].b, &sides[i].c);
18         }
19
20         sum=0;
21         i=0;
```

FIG. 8A

```
22      while (i<N) {
23              a_sqr=sides[i].a * sides[i].a;
24              b_sqr=sides[i].b * sides[i].c;
25              c_sqr=sides[i].c * sides[i].c;
26              if ((sides[i].a==sides[i].b) && (sides[i].b==sides[i].c))
27                  class = equilateral;
28              else if ((sides[i].a==sides[i].b) II (sides[i].b==sides[i].c))
29                  class = isosceles;
30              else if (a_sqr == b_sqr + c_sqr)
31                  class = right;
32              else class = scalene;
33
34              if (class ==right)
35                  area = sides[i].b * sides[i].c / 2.0;
36              else if (class ==equilateral)
37                  area=sides[i].a * sides[i].a * sqrt(3.0) / 4.0;
38              else {
39                  s=(sides[i].a + sides[i].b + sides[i].c) / 2.0
40                  area=sqrt(s * (s - sides[i].a) * (s - sides[i].b) *
41                                      (s - sides[i].c));
42              }
43              sum += area;
44              i += 1;
45      }
46      printf("Sum of areas of the %d triangles is %.2f.\n",N,sum);
47  }
```

FIG. 8B

| TEST |

Failure        (Specify)    (Confirm)

File: triangle.c        Line: 46

Instruction: print("Sum of areas of the %d triangles is %.2f.\n", N, sum);

Variable: sum        Value: 13.90

```
Enter number of triangles:
2
Enter three sides of triangle 1 in ascending order:
3 3 3
Enter three sides of triangle 2 in ascending order:
6 5 4
Sum of areas of the 2 triangles is 13.90
```

| FIG. 10A |
|----------|
| FIG. 10B |

```
╔═══════════════════════════════════════════════╗
│ ▽|           Execution Sequence              ┓│
║                                               ▲║
║ Enter number of triangles::                   ║
║ ------------Correct Flow Point Line (Before)----------
║    ( 1)  13    printf("Enter number of triangles:\n");  ▼
║ 2                                             ║
║    ( 2)  14    scanf("%d", &N);               ║
║    ( 3)  15    for (i = 0; ...; ...)          ║
║    ( 4)  15    for ( ...; i < N; ...)         ║
║ Enter three sides of triangle 1 in ascending order;
║    ( 5)  16       printf("Enter three sides of triangle %d in asc
║ 3 3 3                                         ║
║    ( 6)  17       scanf("%d %d %d", &sides [i].a, &sides [i].b, &si
║    ( 7)  15    for (...; ...; i + +)          ║
║    ( 8)  15    for (...; i < N; ...)          ║
║ Enter three sides of triangle 2 in ascending order:
║    ( 9)  16       printf("Enter three sides of riangle %d in
║ 6 5 4                                         ║
║    (10)  17       scanf("%d %d %d", &sides [i].a, &sides[i].b,
║    (11)  15    for (...; ...; i + +)          ║
║    (12)  15    for (...; i < N; ...)          ║
║    (13)  20    sum = 0;                       ║
║    (14)  21    i = 0;                         ║
║    (15)  22    while (i < N)                  ║
║    (16)  23       a_sqr = sides [i].a * sides [i].a;
╚═══════════════════════════════════════════════╝
```

FIG. 10A

```
( 17)  24      b_sqr = sides [i].b * sides [i].c;
( 18)  25      c_sqr = sides [i].c * sides [i].c;
( 19)  26      if ((sides [i].a == sides [i].b) && (sides [i].b =
( 20)  27          class = equilateral;
( 21)  34      if (class == right)
( 22)  36          if (class == equilateral)
( 23)  37              area = sides [i].a * sides [i].a * sqrt(3
( 24)  43      sum += area;
( 25)  44      i += 1;
............Division Point Line (Before)..................
( 26)  22      while (i < N)
( 27)  23      a_sqr = sides [i].a * sides [i]. a;
( 28)  24      b_sqr = sides [i].b * sides [i]. c;
( 29)  25      c_sqr = sides [i].c * sides [i]. c;
( 30)  26      if ((sides [i].a == sides [i].b) && (sides [i]
( 31)  28          if ((sides [i].a == sides [i].b) II (side
( 32)  30              if (a_sqr == b_sqr + c_sqr)
( 33)  31                  class = right;
( 34)  34      if (class == right)
( 35)  35          area = sides [i].b * sides [i].c / 2.0;
( 36)  43      sum += area;
( 37)  44      i += 1;
( 38)  22      while (i < N)
------------ Wrong Flow Point Line --------------
Wrong variable: sum = 13.900000
```

FIG. 10B

```
                     Execution Sequence
Enter number of triangles:
   ( 1)    13      printf("Enter number of triangles:\n");
2
   ( 2)    14      scanf("%d", &N);
   ( 3)    15      for (i = 0; ...; ...)
   ( 4)    15      for ( ...; i < N; ...)
Enter three sides of triangle 1 in ascending order:
   ( 5)    16         printf("Enter three sides of triangle %d in asc
3 3 3
   ( 6)    17         scanf("%d %d %d", &sides [i].a, &sides [i].b, &si
   ( 7)    15      for (...; ...; i ++)
   ( 8)    15      for (...; i < N; ...)
Enter three sides of triangle 2 in ascending order:
   ( 9)    16         printf("Enter three sides of triangle %d in
6 5 4
   (10)    17         scanf("%d %d %d", &sides [i].a, &sides [i].b,
   (11)    15      for (....; ...; i ++)
   (12)    15      for (...; i < N; ...)
   (13)    20      sum = 0;
   (14)    21      i = 0;
   (15)    22      while (i < N)
   (16)    23         a_sqr = sides [i].a * sides [i].a;
   (17)    24         b_sqr = sides [i].b * sides [i].c;
   (18)    25         c_sqr = sides [i].c * sides [i].c;
   (19)    26         if ((sides [i].a = = sides [i].b && (sides [i].b =
   (20)    27            class = equilateral;
   (21)    34         if (class = = right)
   (22)    36            if (class = = equilateral)
   (23)    37               area = sides [i].a * sides [i].a * sqrt(3
   (24)    43         sum + = area;
   (25)    44         i + = 1;
---------------- Correct Flow Point Line (Before) --------------
   (26)    22      while (i < N)
   (27)    23         a_sqr = sides [i].a * sides [i].a;
................ Division Point Line (Before) ................
   (28)    24         b_sqr = sides [i].b * sides [i].c;
   (29)    25         c_sqr = sides [i].c * sides [i].c;
---------------- Wrong Flow Point Line ---------------
Wrong variable: b_sqr = 20
```

FIG. 16

AUTOMATIC BUG LOCATOR FOR AUTOMATICALLY LOCATING BUGS THROUGH INTERACTION WITH AN OPERATOR

BACKGROUND OF THE INVENTION

1. Field of the Invention

The present invention relates to an automatic bug locator, and more particularly, it relates to an automatic bug locator for a procedure program which simplifies program debugging by identifying the cause of an error by itself and automatically locating the bug through interaction with a programmer.

2. Description of the Background Art

If a test result of a program does not conform to the specification, a part causing the error must be located and corrected in the source program text. This cause is called a bug. If the program has a bug, a wrong value may be set as a variable, to disadvantageously change the flow of control. Conventional techniques for locating bugs include static slicing, dynamic slicing and the like. The static slicing is disclosed in "Automatic Program Bug Location by Program Slicing", by J. R. Lyle and M. Weiser, the Second International Conference on Computers and Applications, June 1987, pp. 877 to 883, for example. On the other hand, the dynamic slicing is disclosed in "Debugging with Dynamic Slicing and Backtracking", by H. Agrawal, R. A. DeMillo and E. H. Spafford, Software-Practice and Experience, Vol. 23, No. 6, pp. 589 to 616 (June 1993), for example. Such static slicing or dynamic slicing is adapted to limit the range of presence of a bug in a program in relation to a variable error. The term "variable error" indicates such an error that the value of a certain variable is wrong at a certain execution point. The execution point is explained. A sequence of executed instructions is called an execution sequence. The instructions in this execution sequence are successively numbered starting with 1. These are called execution points.

The static slicing is adapted to extract all instructions having the possibility of influencing a wrong value of a certain variable from the overall program. The extracted instructions are called static slices.

On the other hand, the dynamic slicing is adapted to extract all executed instructions actually influencing a wrong value of a certain variable as a result of execution of a program with a certain input from the overall program. The extracted instructions are called dynamic slices.

FIG. 17 is a schematic block diagram showing a bug locator utilizing the dynamic slicing. The bug locator utilizing the dynamic slicing comprises an instrument part 1, a compile and link part 3 and a program execution control part 35. The program execution control part 35 includes a data dependence recording part 37, a control dependence recording part 39 and a dynamic slice display part 41. The instrument part 1 embeds codes which are necessary for recording dependences (data and control dependences) between instructions in a source program 17 to be debugged, and produces a source program 19. Namely, the source program 19 is instrumented. A compiler may be modified so that an object code has a function equivalent to that of the instrument part 1. The compile and link part 3 compiles and links the source program 19, and produces an executable program 21. The program execution control part 35 controls execution of the executable program 21. The data dependence recording part 37 records the data dependence between the instructions. The control dependence recording part 39 records the control dependence. On the basis of a found variable error, the dynamic slice display part 41 analyzes the dependences between the instructions starting with an instruction causing the error, thereby extracting dynamic slices and displays the same on a program text window 43.

The static slicing has such a problem that excess instructions such as unexecuted ones which are irrelevant to the error are also extracted, although the static slices surely includes a bug. The static slicing also has such a problem that the programmer must locate the bug in the extracted static slices on his own with no effective support by the system.

On the other hand, the dynamic slicing has such a problem that the instruction including the bug causing the error is omitted from the dynamic slices although the dynamic slices form a smaller set than the static slices. This problem is described in "Critical-Slice Based Bug-Locating Strategy in Variable Value Errors", by T. Shimomura, Trans. IPS Japan, Vol. 33, No. 4, April 1992, pp. 501 to 511. The dynamic slicing also has such a problem that the programmer must locate the bug in the extracted static slices on his own with no effective support by the system, similarly to the static slicing.

In the static or dynamic slicing, as hereinabove described, the programmer must locate the bug on his own by repeating operations of presuming the cause for the error in the extracted slices and investigating the program state.

SUMMARY OF THE INVENTION

The present invention has been proposed in order to solve the aforementioned problems, and an object thereof is to provide an automatic bug locator which can simplify program debugging as compared with the static slicing and dynamic slicing.

The inventive automatic bug locator is adapted to locate a bug in a program which is described in a procedural program language. This automatic bug locator comprises a test control part, a program rerun part, a dependence analyzing part, and a verification-by-division control part.

The test control part makes a program executed so that an operator points out an error from output information from the program, and records the location of the instruction outputting the error. The program rerun part makes the program rerun up to a first instruction part. The dependence analyzing part selects a third instruction part between a second instruction part and the first instruction part, and finds an instruction in an instruction part causing transition of control to the third instruction part and a result of execution of this instruction, in a rerun by the program rerun part. Further, the dependence analyzing part finds a variable influencing the error and a value of the variable at the third instruction part on the basis of a data dependence, a control dependence, a control definition dependence and an omissive condition dependence. The first instruction part is the part having the instruction outputting the error. The second instruction part is a part having an instruction executed first in the program.

If the result of execution of the instruction causing the transition of control to the third instruction part is wrong, the verification-by-division control part makes the operator determine whether or not the value of a variable used in the instruction causing the transition of control is wrong. If the result of execution of the instruction causing the transition of control to the third instruction part is correct, on the other hand, the verification-by-division control part makes the operator determine whether or not the value of the variable influencing the error at the third instruction part is wrong.

When the operator determines that the value of the variable used in the instruction causing the transition of control to the third instruction part is wrong, the instruction part causing the transition of control to the third instruction part is regarded as the first instruction part, so that the program rerun part and the dependence analyzing part perform processing. When the operator determines that the value of the variable used in the instruction causing transition of control to the third instruction part is correct, on the other hand, the verification-by-division control part determines that the instruction causing the transition of control is a bug. When the operator determines that the value of the variable influencing the error at the third instruction part is wrong, the third instruction part is regarded as the first instruction part so that the program rerun part and the dependence analyzing part perform processing. When the operator determines that the value of the variable influencing the error at the third instruction part is correct, the third instruction part is regarded as the second instruction part so that the program rerun part and the dependence analyzing part perform processing.

The processing by the program rerun part, the dependence analyzing part and the verification-by-division control part is repeated, so that the verification-by-division control part determines an instruction in an instruction part finally existing between the first and second instruction parts as a bug. When no instruction part having a data dependence, a control dependence, a control definition dependence or an omissive condition dependence on the first instruction part is present between the first and second instruction parts after the processing is repeated by the program rerun part, the dependence analyzing part and the verification-by-division control part, the verification-by-division control part determines that a bug related to omission of an instruction is present between the first and second instruction parts.

An instruction part preceding a certain instruction part and finally defining a variable used in an instruction which is present in the certain instruction part has a data dependence on the certain instruction part. An instruction part provided with a conditional instruction or a loop instruction has a control dependence on a certain instruction part in the branch of the conditional instruction or the loop of the loop instruction. When an instruction part preceding a certain instruction part and finally defining a variable used in an instruction which is present in the certain instruction part is included in the branch of a conditional instruction or the loop of a loop instruction and the certain instruction is present outside the branch of the conditional instruction or the loop of the loop instruction, the instruction part provided with the conditional or loop instruction has a control definition dependence on the certain instruction part. When an instruction part preceding a certain instruction part and finally defining a variable used by an instruction which is present in the certain instruction part is present before a conditional instruction or a loop instruction, the variable is defined if a result of execution of the conditional or loop instruction changes, and the certain instruction part is present outside the branch of the conditional instruction or the loop of the loop instruction, the instruction part provided with the conditional or loop instruction has an omissive condition dependence on the certain instruction part.

Thus, the inventive automatic bug locator itself identifies the cause of an error in place of the programmer, and automatically locates the bug through interaction with the programmer. Therefore, program debugging is simplified as compared with the dynamic slicing or static slicing.

Further, the inventive automatic bug locator employs the control definition dependence and the omissive condition dependence. Therefore, it is possible to avoid problems of disadvantageously extracting excess instructions irrelevant of an error and omitting extraction of an instruction including the bug causing the error.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8, 8A and 8B show a source text for a program "triangle" employed for illustrating exemplary debugging by the automatic bug locator shown in FIG. 1;

FIG. 9 illustrates an exemplary display on a test window shown in FIG. 1;

FIGS. 10, 10A and 10B illustrate an exemplary display on an execution sequence window (FIG. 1) in first verification-by-division;

FIG. 16 illustrates an exemplary display on the execution sequence window (FIG. 1) in fourth verification-by-division.

DESCRIPTION OF THE PREFERRED EMBODIMENTS

Figure 1:
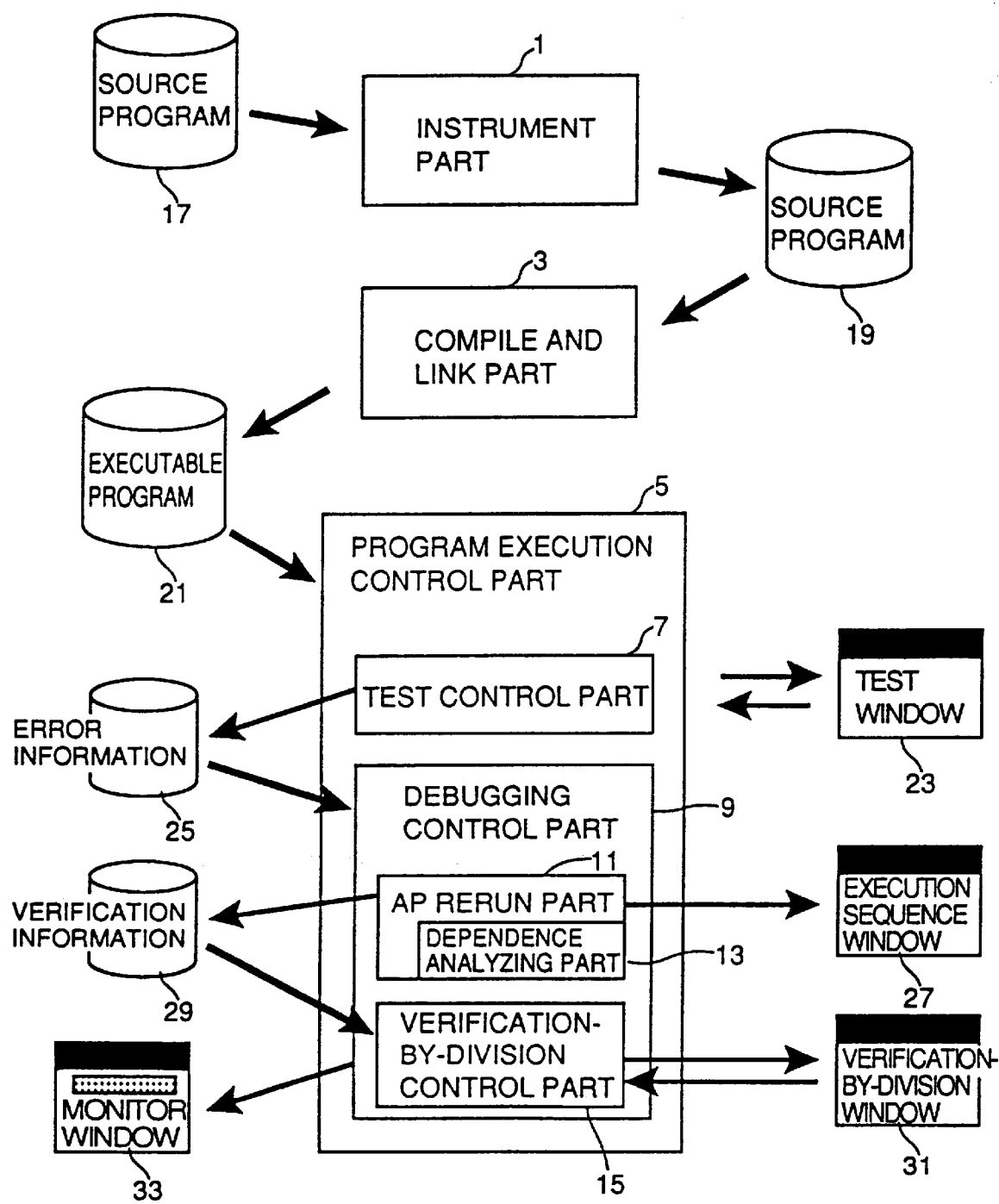
FIG. 1 is a schematic block diagram showing an automatic bug locator according to an embodiment of the present invention.

FIG. 1 is a schematic block diagram showing an automatic bug locator according to an embodiment of the present invention. Referring to FIG. 1, the automatic bug locator according to this embodiment comprises an instrument part 1, a compile and link part 3 and a program execution control part 5. The program execution control part 5 includes a test control part 7 and a debugging control part 9. The debugging control part 9 includes an AP rerun part 11, a dependence analyzing part 13 and a verification-by-division control part 15.

In the automatic bug locator according to this embodiment, a general procedural language such as FORTRAN, COBOL, Ada, Pascal or C is assumed as the program language for debugging. In the following description, it is assumed that instructions in the program consist of an assignment instruction, a conditional instruction, a loop instruction, a procedure call instruction, an input instruction and an output instruction, for simplifying the illustration.

The terms employed for describing the automatic bug locator according to the embodiment are described. A sequence of executed instructions is called an execution sequence. The instructions in the execution sequence are successively numbered starting with 1. These are called execution points. In start of debugging, it is assumed that a start of execution point (execution point provided with the instruction executed first) is a normal point, and an execution point causing an error is an abnormal point.

Figure 2:
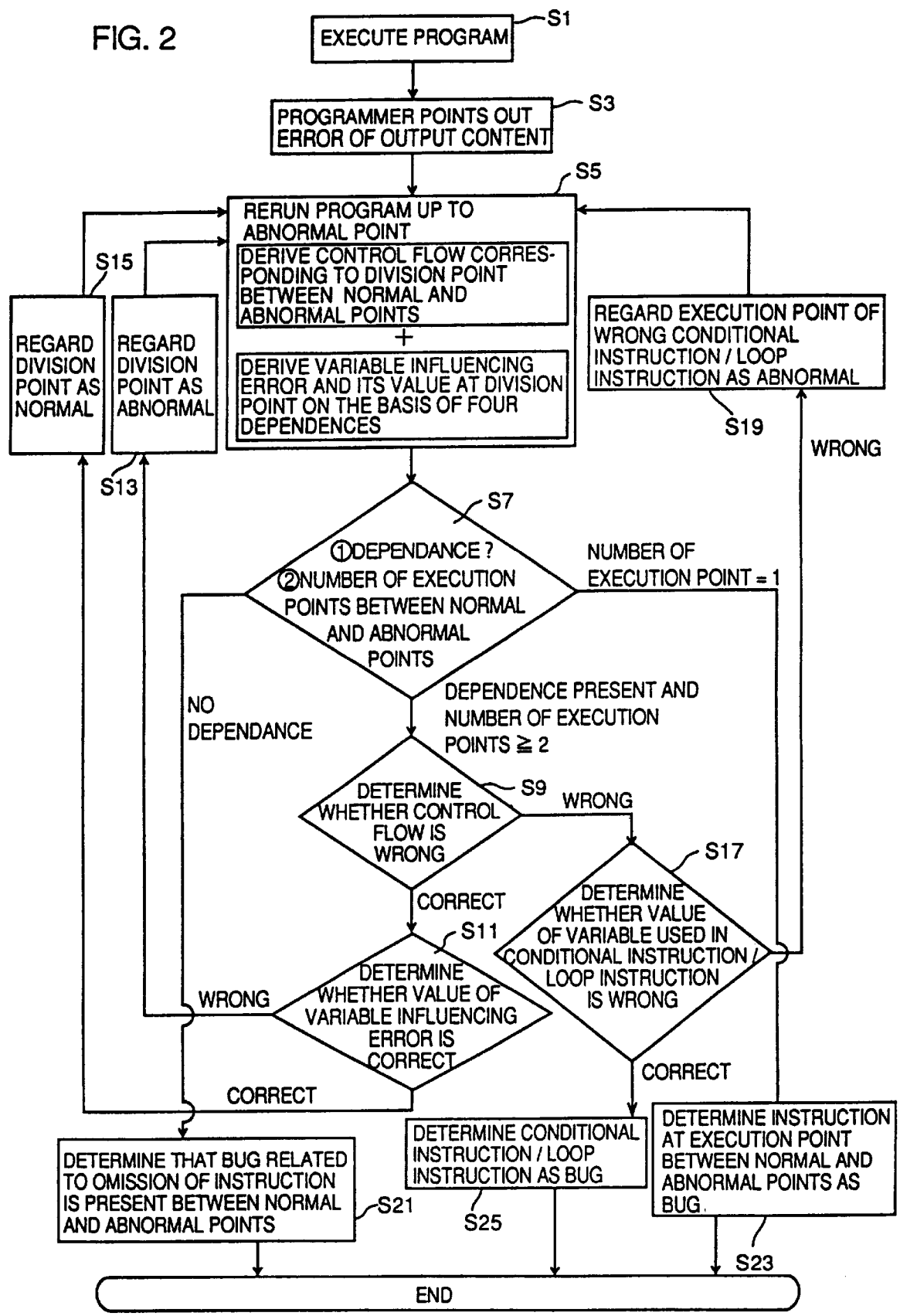
FIG. 2 is a flow chart for illustrating processing in the automatic bug locator shown in FIG. 1.

FIG. 2 is a flow chart for illustrating the processing in the automatic bug locator shown in FIG. 1. With reference to FIGS. 1 and 2, an outline of the processing in the automatic bug locator shown in FIG. 1 is described. At a step S1, the test execution control part 7 executes an executable program 21, and displays the result on a test window 23. At a step S3, the programmer points out an error part in the output displayed on the test window 23.

At a step S5, the AP rerun part 11 makes the executable program 21 rerun from a start of execution point to an abnormal point. At the step S5, further, the dependence analyzing part 13 divides the execution sequence between the normal and abnormal points into two, and derives a control flow corresponding to the division point. The term "control flow" indicates an instruction at an execution point causing transition of control to the division point and a result of execution of this instruction. In more concrete terms, the term "control flow" indicates a conditional instruction and a result of its execution, or a loop instruction and a result of its execution. At the step S5, further, the dependence analyzing part 13 derives a variable influencing the error and a value of the variable at the division point on the basis of four dependences. At the step S5, in addition, the verification-by-division control part 15 displays the control flow, the variable influencing the error and the value of the variable at the division point on a verification-by-division window 31.

If no instruction having any dependence on the variable having a wrong value at the abnormal point is present between the normal and abnormal points, i.e., if no execution point having any dependence on the abnormal point is present between the normal and abnormal points at a step S7, the process advances to a step S21. At the step S21, the verification-by-division control part 15 determines that a bug related to omission of an instruction is present between the normal and abnormal points. In other words, located is such a bug that setting of the value of a variable between the normal and abnormal points is omitted. Although the value of a certain variable w is wrong at the abnormal point, the value of this variable w is correct at the normal point and there is no instruction for setting the value for the variable w on an arbitrary path leading from the normal point to the abnormal point.

When a single execution point is present between the normal point and the abnormal point at the step S7, on the other hand, the process advances to a step S23. At the step S23, the verification-by-division control part 15 determines an instruction which is present at the single execution point as a bug.

When an execution point having some dependence on the abnormal point is present between the normal and abnormal points and at least two execution points are present between the normal and abnormal points at the step S7, the process advances to a step S9.

At the step S9, the programmer determines whether or not the control flow displayed on the verification-by-division window 31 is wrong. If the programmer determines that the control flow is correct at the step S9, the process advances to a step S11. At the step S11, the programmer determines whether or not the value of the variable influencing the error displayed on the verification-by-division window 31 is wrong. If the programmer determines that the value of the variable influencing the error is wrong at the step S11, the process advances to a step S13. At the step S13, the division point is regarded as abnormal. Then, the process returns to the step S5. If the programmer determines that the value of the variable influencing the error is correct at the step S11, on the other hand, the process advances to a step S15. At the step S15, the division point is regarded as normal. Then, the process returns to the step S5.

When the programmer determines that the control flow is wrong at the step S9, the process advances to a step S17. At the step S17, the programmer determines whether or not the value of a variable used in the conditional instruction or the loop instruction (hereinafter referred to as "conditional instruction/loop instruction") is wrong. If the programmer determines that the value of the variable used in the conditional instruction/loop instruction is wrong at the step S17, the process advances to a step S19. At the step S19, the execution point provided with the wrong conditional instruction/loop instruction is regarded as abnormal. Then, the process returns to the step S5.

The processing through the steps S5, S7, S9, S11 and S13, through the steps S5, S7, S9, S11 and S15, or through the steps S5, S7, S9, S17 and S19 is called "verification-by-division". If such verification-by-division is repeated, the execution points present between the normal and abnormal points are finally singularized. An instruction which is present in the singularized execution point includes the bug.

When the programmer determines that the value of the variable used in the conditional instruction/loop instruction is correct at the step S17, the process advances to a step S25. At the step S25, the verification-by-division control part 15 determines the conditional instruction/loop instruction as the bug.

The four dependences employed by the dependence analyzing part 13 for deriving the variable influencing the error and the value of the variable at the division point at the step S5 are briefly described. The four dependences are the data dependence, the control dependence, the control definition dependence and the omissive condition dependence.

Figure 3:
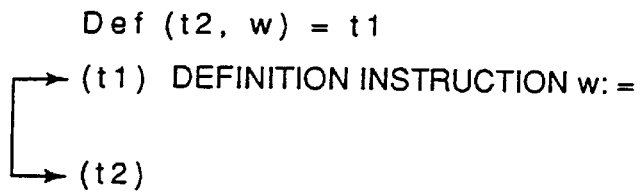
FIG. 3 is adapted to illustrate a data dependence.

FIG. 3 is adapted to illustrate the data dependence. Referring to FIG. 3, t1 and t2 denote execution points. The execution point t1 preceding the execution point t2 and having an instruction (definition instruction w:=) finally defining a variable w used in an instruction present at the execution point t2 has a data dependence on the execution point t2. In other words, the instructions at the execution points t1 and t2 are in a data dependence on each other. Such a data dependence is expressed as follows:

$$Def(t2, w)=t1 \qquad <1>$$

Figure 4:
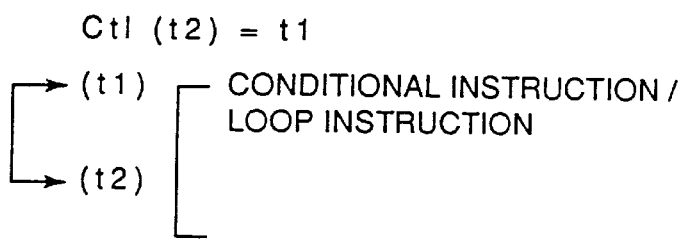
FIG. 4 is adapted to illustrate a control dependence.

FIG. 4 is adapted to illustrate the control dependence. Referring to FIG. 4, an execution point t1 provided with a conditional instruction/loop instruction has a control dependence on an execution point t2 in the branch of the conditional instruction or the loop of the loop instruction. In other words, the instructions at the execution points t1 and t2 are in a control dependence on each other. Such a control dependence is expressed as follows:

$$Ctl(t2)=t1 \qquad <2>$$

Figure 5:
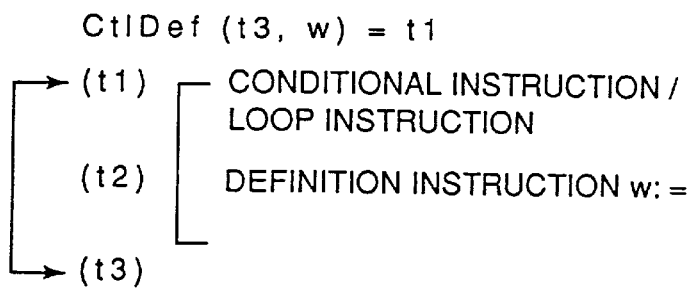
FIG. 5 is adapted to illustrate a control definition dependence.

FIG. 5 is adapted to illustrate the control definition dependence. Referring to FIG. 5, t1, t2 and t3 denote execution points. When the execution point t2 preceding the execution point t3 and having an instruction (definition instruction w:=) finally defining a variable used in an instruction present at the execution point t3 is included in the branch of a conditional instruction or the loop of a loop instruction and the execution point t3 is present outside the branch of the conditional instruction or the loop of the loop instruction, the execution point t1 provided with the conditional instruction/loop instruction has a control definition dependence on the execution point t3. In other words, the instructions at the execution points t1 and t3 are in a control definition dependence on each other. Such a control definition dependence is expressed as follows:

$$CtlDef(t3, w)=t1 \qquad <3>$$

Figure 6:
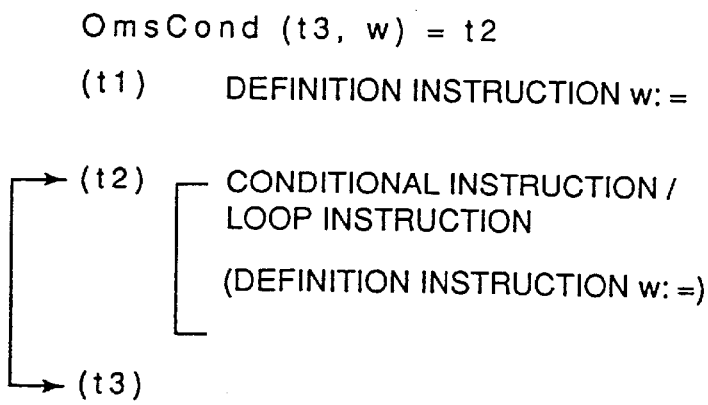
FIG. 6 is adapted to illustrate an omissive condition dependence.

FIG. 6 is adapted to illustrate the omissive condition dependence. Referring to FIG. 6, t1, t2 and t3 denote execution points. When the execution point t1 preceding the execution point t3 and having an instruction (definition instruction w:=) finally defining a variable w used by an instruction present at the execution point t3 is present before the execution point t2 provided with a conditional instruction/loop instruction, the variable w is defined if the result of execution of the conditional instruction/loop instruction at the execution point t2 changes and the execution point t3 is present outside the branch of the conditional instruction or the loop of the loop instruction, the execution point t2 provided with the conditional instruction/loop instruction has an omissive condition dependence on the execution point t3. In other words, instructions at the execution points t2 and t3 are in an omissive condition dependence on each other. Such an omissive condition dependence is expressed as follows:

$$OmsCond(t3, w)=t2 \qquad <4>$$

Def(t2, w), Ctl(t2), CtlDef(t3, w) and OmsCond(t3, w) may be referred to as a data dependence at the execution point t2, a control dependence at the execution point t2, a control definition dependence at the execution point t3 and an omissive condition dependence at the execution point t3 respectively. The control definition dependence influences the variable by wrongly setting its value due to an error in the result of execution of the conditional instruction or the loop instruction. The omissive condition dependence influences the variable by omitting setting of the value due to an error in the result of execution of the conditional instruction or the loop instruction.

The instrument part 1 shown in FIG. 1 is now described in detail. The instrument part 1 embeds codes necessary for executing processing described in the test control part 7, the AP rerun part 11 and the dependence analyzing part 13 in a source program 17, and produces a source program 19. Namely, the source program 19 is an instrumented program.

The compile and link part 3 shown in FIG. 1 is described. The compile and link part 3 compiles and links the source program 19, and produces an executable program 21.

The test control part 7 of the program execution control part 5 shown in FIG. 1 is described in detail. The test control part 7 executes the executable program 21, and displays an input and an output in and from the executable program 21 on the test window 23. When the programmer selects a wrong part (error part) from the output content with a mouse, the test control part 7 records the output instruction outputting the selected part, the variable name, the value of the variable and the execution point as error information 25.

The AP rerun part 11 of the debugging control part 9 included in the program execution control part 5 shown in FIG. 1 is described in detail. The AP rerun part 11 makes the executable program 21 rerun up to the execution point (abnormal point) causing the error recorded as the error information 25. Then, the AP rerun part 11 displays a sequence of rerun instructions (execution sequence) on an execution sequence window 27.

The dependence analyzing part 13 of the debugging control part 9 shown in FIG. 1 is described in detail. The dependence analyzing part 13 records various types of dependences (the data dependence, the control dependence, the control definition dependence and the omissive condition dependence) between the instructions during the rerun of the executable program 21, and generates verification-by-division information 29 necessary for verification-by-division.

The information recorded by the dependence analyzing part 13 during the rerun of the executable program 21 is described. When a conditional instruction or a loop instruction is executed, an execution point p and appended information thereof are pushed down in a stack CurrentCtl. The appended information includes the executed conditional instruction or loop instruction, the result of execution, a set of used variables and the values of these variables. When execution of a conditional statement or a loop statement is ended, pushed information is popped up from the stack CurrentCtl necessary times. A stack (excluding the appended information) consisting of only execution points in the stack CurrentCtl at an execution point c is expressed as a control dependence Ctl(c).

When an assignment instruction is executed for defining the variable w at an execution point d, the execution point d is set as LastDef(w), and a control dependence Ctl(d) at an execution point d is set as LastDefCtl(w).

At an execution point p for executing a conditional instruction or a loop instruction, the execution point p is added to OmsCondCandidates(w) if variable w is included in OmsVars(p). OmsVars(p) is a set of variables which may be defined (whose values may be set) when control transition at the execution point p changes. This is a set of variables which may be defined in then branches or else branches of a conditional statement or in a loop statement, and previously found in the instrument part 1 for each conditional or loop instruction.

When the assignment instruction is executed for defining the variable w, OmsCondCandidates(w) is set to an empty set φ.

Decision of a division point made by the dependence analyzing part 13 is described. In the vicinity of an execution point dividing normal and abnormal points, an execution point having a small nest level of the conditional instruction or the loop instruction is selected as the division point.

The derivation of the control flow at the division point performed by the dependence analyzing part 13 is described.

An instruction (a conditional instruction or a loop instruction) at an execution point causing transition of control to a division point i and a result of execution of this instruction, i.e., a control flow, is obtained from the stack CurrentCtl at the division point i. Further, the variable used in the instruction (the conditional or loop instruction) causing the transition of control to the division point i and the value of this variable are also obtained from the stack CurrentCtl at the division point i.

The derivation of the variable influencing the error and the value of the variable at the division point made by the dependence analyzing part 13 is described. For the division point i, a data dependence Def(j, w), a control definition dependence CtlDef(j, w) and an omissive condition dependence OmsCond(j, w) are found in relation to each execution point j such that i–j and each variable w used at each execution point j, as follows:

$$Def(j, w) := LastDef(w) \qquad <5>$$

$$CtlDef(j, w) := LastDefCtl(w) - Ctl(j) \qquad <6>$$

$$OmsCond(j, w) := OmsCondCandidates(w) - Ctl(j) \qquad <7>$$

If the data dependence Def(j, w)<i, the variable w and the value of this variable are recorded in link information LinkInf(j) appended to the execution point j. If i≦k with respect to each execution point k∈Def(j, w)∪CtlDef(j, w)∪OmsCond(j, w), link information LinkInf(k) appended to an execution point k is added to the link information LinkInf(j) appended to the execution point j. The variable to be verified at the division point i and the value of this variable are found from link information at an abnormal point. Ctl is employed for defining CtlDef and OmsCond.

The verification-by-division control part 15 shown in FIG. 1 is described in detail. The verification-by-division control part 15 displays verification-by-division information (the division point, the control flow at the division point, the variable influencing the error and the value of the variable influencing the error at the division point) on the verification-by-division window 31 to interact with the programmer and narrows the potential range for the bug, for finally locating the bug and displaying it on a monitor window 33.

Figure 7:
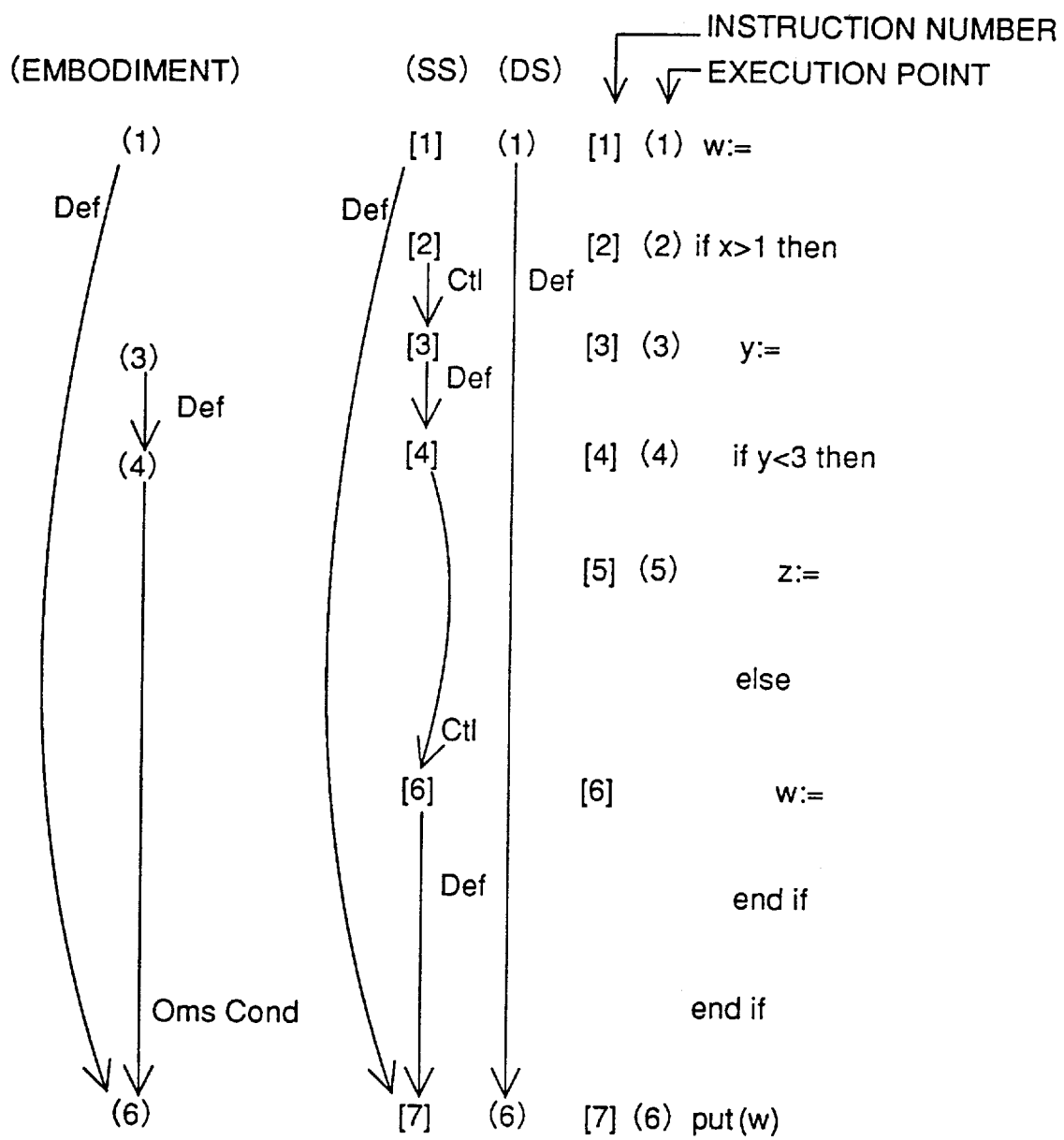
FIG. 7 is adapted to comparatively illustrate dependences employed in the automatic bug locator shown in FIG. 1, dynamic slicing and static slicing respectively.

FIG. 7 is adapted to comparatively illustrate the dependences employed in the automatic bug locator according to this embodiment, dynamic slicing (DS) and static slicing (SS) respectively. Referring to FIG. 7, (1) to (6) denote execution points, and [1] to [7] denote instruction numbers. The instruction (w:=) of the instruction number [1] is a definition instruction, the instruction (if x>1 then) of the instruction number [2] is a conditional instruction, the instruction (y:=) of the instruction number [3] is a definition instruction, the instruction (if y<3 then) of the instruction number [4] is a conditional instruction, the instruction (z:=) of the instruction number [5] is a definition instruction, the instruction (w:=) of the instruction number [6] is a definition instruction, and the instruction (put(w)) of the instruction number [7] is an output instruction.

The dynamic slicing (DS) employs only the data dependence Def in this example. Thus, it is apprehended that an instruction including a bug causing an error may be omitted. The static slicing (SS) employs two control dependences Ctl and three data dependences Def. Due to such extraction of a number of instructions, excess instructions are disadvantageously extracted irrelevantly to the error. On the other hand, the automatic bug locator according to this embodiment employs two data dependences Def and one omissive condition dependence OmsCond. Thus, the number of instructions extracted in the automatic bug locator according to this embodiment is neither too small nor too large as compared with the dynamic slicing (DS) and the static slicing (SS). The program shown in FIG. 7 is a mere example, and no control definition dependence CtlDef is present in this program.

As hereinabove described, the automatic bug locator according to this embodiment identifies the cause of an error in place of the programmer and automatically locates the bug through interaction with the programmer. Therefore, program debugging is simplified as compared with the dynamic slicing and the static slicing.

Further, the automatic bug locator according to this embodiment employs the control definition dependence CtlDef and the omissive condition dependence OmsCond. Thus, it is possible to avoid the problem of extracting excess instructions irrelevant to the error and the problem of omitting the instruction including the bug causing the error.

Exemplary debugging by the automatic bug locator shown in FIG. 1 is now described with a program "triangle" described in C, cited from the prior art (H. Agrawal, R. A. DeMillo and E. H. Spafford, "Debugging with Dynamic Slicing and Backtracking", Software-Practice and Experience, Vol. 23, No. 6, pp. 589 to 616 (June 1993).

FIG. 8 shows the source text of the program "triangle" employed for illustrating exemplary debugging by the automatic bug locator shown in FIG. 1. This program "triangle" is adapted to load the lengths of three sides of N triangles and calculate the areas of the respective triangles, for outputting the total sum. The respective triangles are first classified as equilateral, isosceles, right and scalene triangles, so that the areas of the respective triangles are found through corresponding formulas.

Referring to FIG. 1, the test control part 7 first executes the program "triangle" on the test window 23. FIG. 9 illustrates an exemplary display on the test window 23 shown in FIG. 1. Referring to FIG. 9, the programmer enters 3, 3, 3 and 6, 5, 4 as the lengths of three sides of two triangles respectively. The areas of the respective triangles are 3.90 and 9.92 respectively, and hence the correct output is 13.82. Due to a bug present in the program, however, a wrong value 13.90 is outputted. The programmer selects the wrong value with a mouse, clicks a "Specify" button, confirms the instruction outputting the wrong value and its variable name, and thereafter clicks a "Confirm" button. Referring to FIG. 1, the test control part 7 records the output instruction (printf("Sum of areas of the %d triangles is %.2f.\n",N, sum);) making the wrong output, the variable name (sum), the value (13.90) and the execution point (39) as the error information 25.

Then, the AP rerun part 11 makes the executable program 21 rerun up to the execution point 39 causing the error recorded as the error information 25, and displays the execution sequence (sequence of executed instructions) on the execution sequence window 27. FIG. 10 illustrates an exemplary display on the execution sequence window 27 shown in FIG. 1. Referring to FIG. 10, the execution points of the respective executed instructions are parenthesized. Numerals appearing immediately before the respective instructions express the numbers of the respective instructions on the source program shown in FIG. 8. On this execution sequence window 27, inputted data can also be confirmed, in addition to the executed instructions.

"Correct Flow Point Line (Before)" is displayed before a normal point. "Division Point Line (Before)" is displayed before a division point. "Wrong Flow Point Line" is displayed before an abnormal point.

Referring to FIGS. 1 and 10, the dependence analyzing part 13 selects the execution point 26 as the division point, and generates verification-by-division information which is necessary for verification-by-division while recording various types of dependences between the instructions during rerun of the executable program 21. The control flow at the division point 26 is found from the stack CurrentCtl at the division point 26. The content of the stack CurrentCtl at the division point 26 has been pushed down in the stack CurrentCtl when a loop instruction "while (i<N)" has been executed at the execution point 15. Thus, the content of the stack Current Ctl at the division point 26 is {(execution point 15, "22 while (i<N)", true, i=0, N=2)}.

Figure 11:
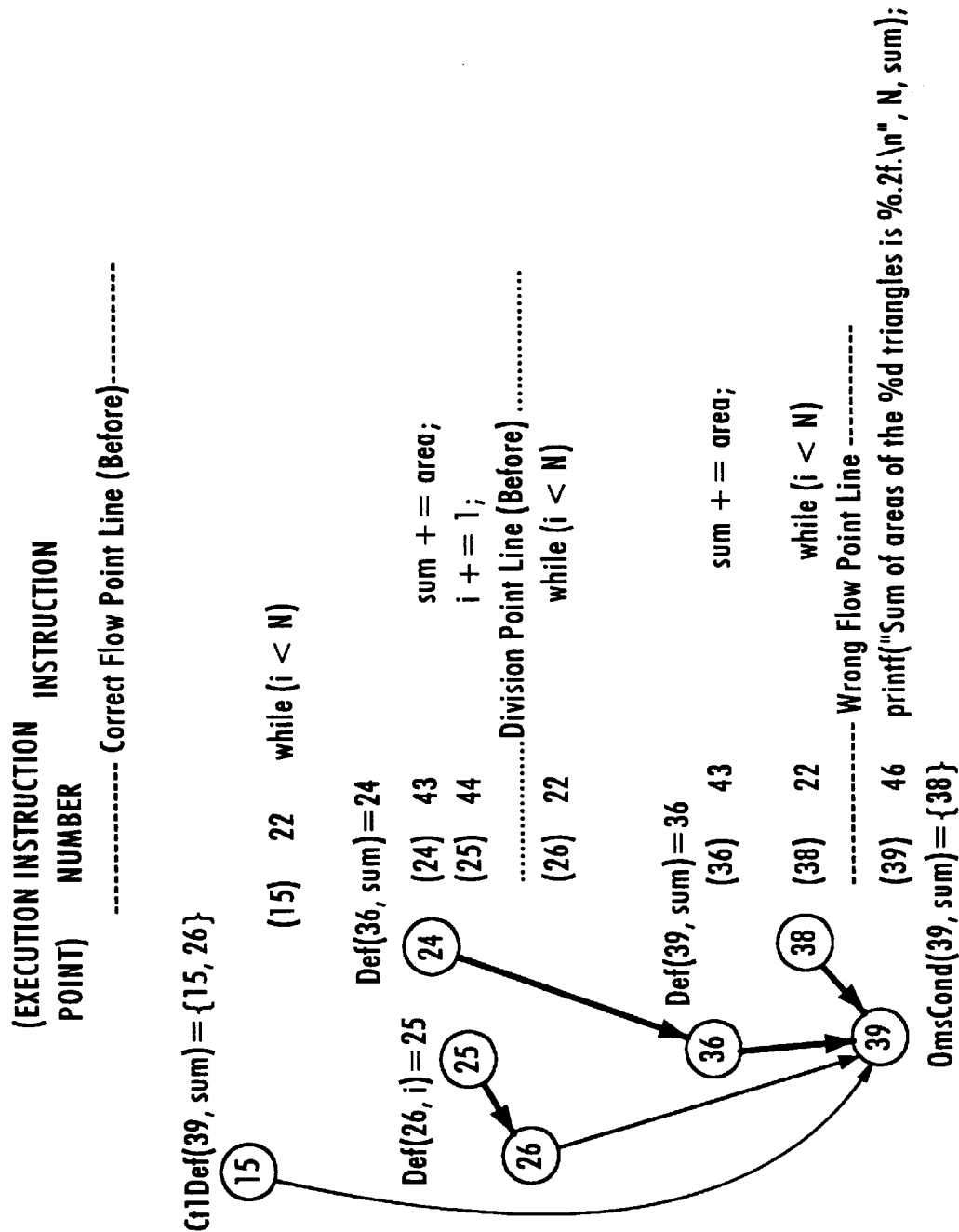
FIG. 11 illustrates dependences between instructions necessary for finding a variable influencing an error and a value of the variable at a division point.

FIG. 11 illustrates the dependences (the data dependence Def, the control definition dependence CtlDef and the omissive condition dependence OmsCond) between instructions which are necessary for finding the variable influencing the error and the value of this variable at the division point 26. Referring to FIG. 11, only the dependences necessary for finding the variable influencing the error and the value of this variable at the division point are illustrated. Displays identical to those in FIG. 10 have the same meanings. With reference to FIG. 11, the processing necessary for finding the variable influencing the error and the value of this variable at the division point 26 is described. In the following description, only the minimum processing necessary for finding the variable and the value of the variable at the division point 26 is extracted.

First processing is described. LastDef(sum)=24 is set when the execution point 24 is executed. Second processing is described. LastDef(i)=25 is set when the execution point 25 is executed.

Third processing is described. When each execution point j such that 26≦j, where execution point 26 is the division point, is executed, a data dependence Def(j, w), a control definition dependence CtlDef(j, w) and an omissive condition dependence OmsCond(j, w) are found in relation to each variable w used at execution point j. When the execution point 26 is executed, the data dependence Def(26, i)=LastDef(i)=25. From the data dependence Def(26, i)=25<26, link information LinkInf(26)={i=1}. A loop instruction is executed here, and hence the execution point 26 and its appended information are pushed down so that the stack CurrentCtl=(execution point 15, "22 while (i<N)", true, i=0, N=2), (execution point 26, "22 while (i<N)", true, i=1, N=2).

Fourth processing is described. When the execution point 36 is executed, the data dependence Def(36, sum)=LastDef (sum)=24. From the data dependence Def(36, sum) =24<26, link information LinkInf(36)={sum=3.897114}. An assignment instruction is executed here, and hence LastDef(sum) =36 is newly set and the control dependence Ctl(36) is set as LastDefCtl(sum), so that LastDefCtl(sum)={execution point 15, execution point 26}.

Fifth processing is described. When the execution point 38 is executed, a loop instruction is executed, and if control transition at the execution point 38 changes, there is a possibility that a variable "sum" is defined (since OmsVars (38)={sum, i, a_sqr, b_sqr, . . . }), and hence OmsCondCandidates(sum)={38}. When the execution of the execution point 38 is ended, execution of a loop statement is terminated, and hence the stack CurrentCtl=φ.

Sixth processing is described. When the execution point 39 is executed, the output instruction causing the error is executed, and the data dependence Def(39, sum)=LastDef (sum)=36. Further, the control definition dependence CtlDef (39, sum)=LastDefCtl(sum)−Ctl(39)={15, 26}φ={15, 26}. Further, the omissive condition dependence OmsCond(39, sum)=OmsdCondCandidates(sum)−Ctl(39) ={38}φ={38}. Further, Def(39, sum)∪CtlDef (39, sum)∪OmsCond(39, sum)={36}∪{15, 26}∪{38}={15, 26, 36, 38}, and when link information LinkInf(k) appended to an execution point k (26≦k) is added to link information LinkInf(39) appended to the execution point 39, LinkInf(39)=LinkInf(26)∪LinkInf (36)∪LinkInf(38) ={i=1, sum=3.897114}. While detailed description is omitted, it has been recognized that no additional variable is present from the link information LinkInf (38).

Due to the aforementioned first to sixth processing, it is understood that the variable influencing the error and the value of this variable at the division point 26 are the variable i=1 and the variable sum=3.897114.

Figure 12:
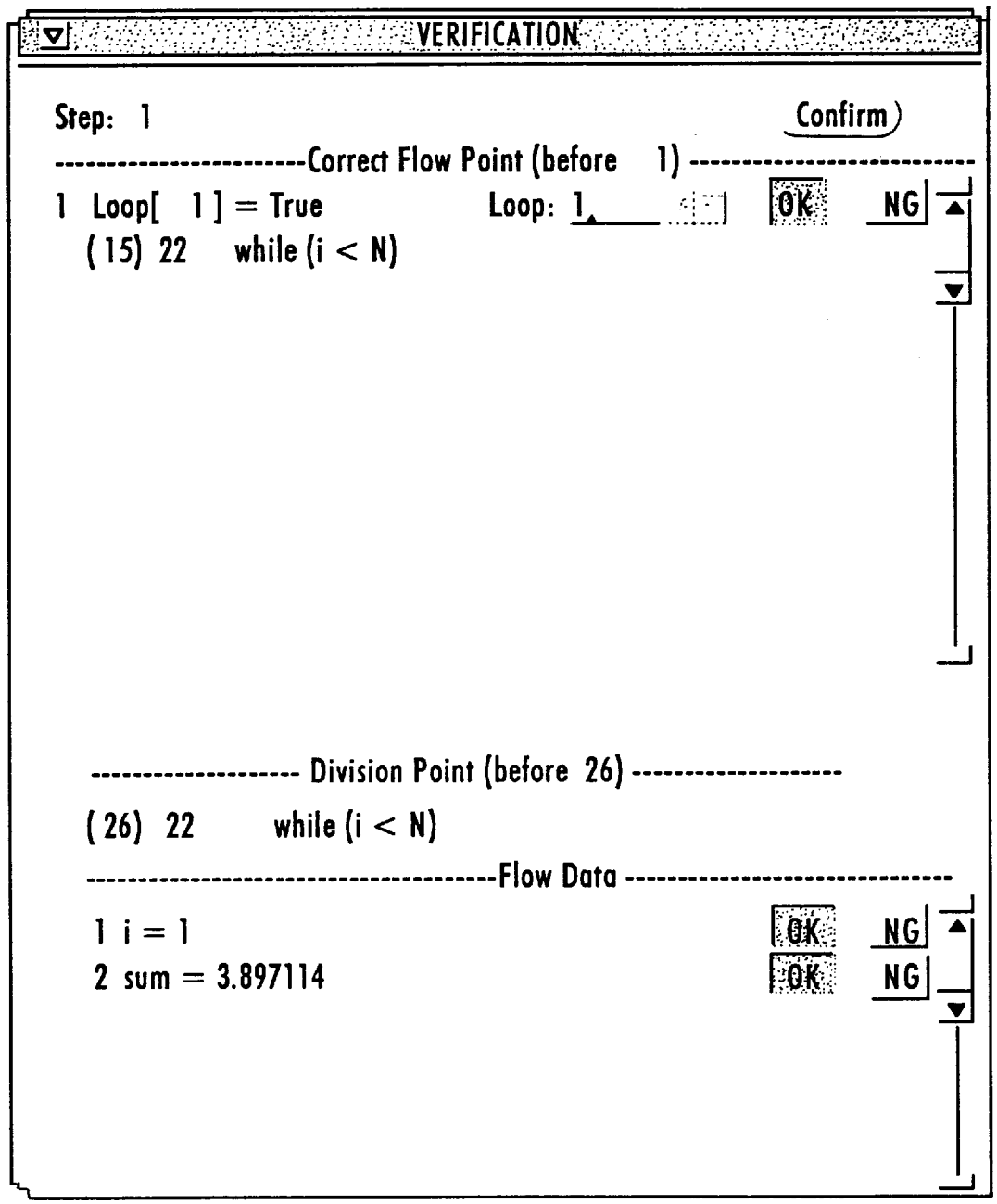
FIG. 12 illustrates an exemplary display on a verification-by-division window (FIG. 1) in first verification-by-division.

Referring to FIG. 1, the verification-by-division control part 15 displays the generated verification-by-division information (the division point, the control flow at the division point, the variable influencing the error and the value of the variable at the division point) on the verification-by-division window 31. FIG. 12 illustrates an exemplary display on the verification-by-division window 31 (FIG. 1) in the first verification-by-division. The control flow at the division point 26 is displayed under the display "Correct Flow Point (before 1)". Under the display "Division Point (before 26)", further, the division point and the instruction which is present at the division point are displayed. Under the display "Flow Data", in addition, the variable influencing the error and the value of the variable at the division point are displayed. Referring to FIGS. 1 and 12, first repetition of the loop statement, i.e., calculation of the area of the first triangle is ended before the division point 26, and the values of the variable i=1 and the variable sum=3.897114 are correct. When the programmer selects "OK" with the mouse and clicks the "Confirm" button (the process is regarded as OK if neither "OK" nor "NG" is selected), so that the verification-by-division control part 15 sets this division point as the normal point, transfers the control to the AP rerun part 11, and continues the verification-by-division for locating the bug which is present between the normal and abnormal points. It should be noted here that the values of the variables class, a_sqr, b_sqr, c_sqr, area, s and the like other than the variables i and sum need not to be examined at this point of time. When the "Confirm" button is clicked on the verification-by-division window 31 in the first verification-by-division, the display changes to that in second verification-by-division.

Figure 13:
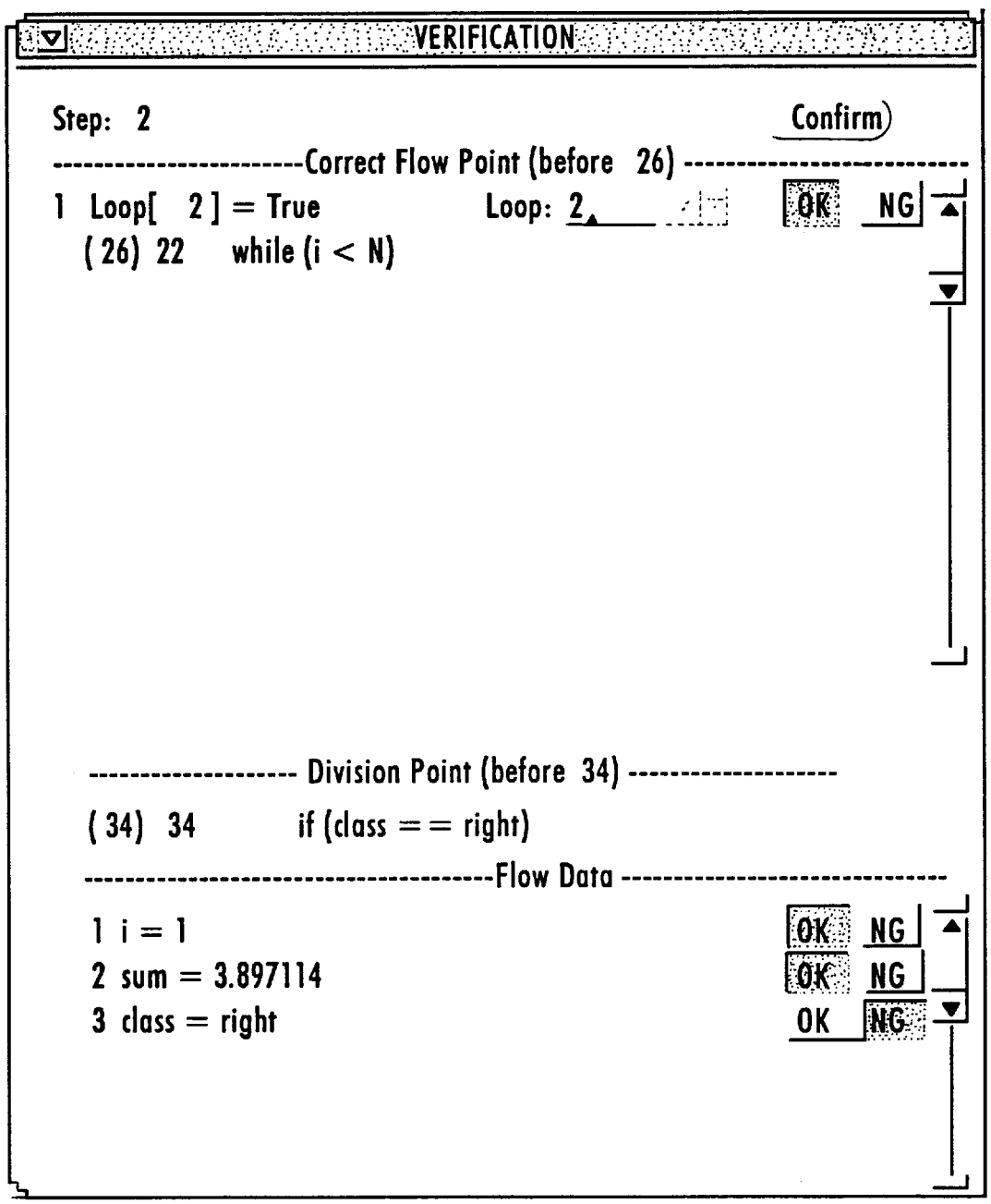
FIG. 13 illustrates an exemplary display on the verification-by-division window (FIG. 1) in second verification-by-division.

FIG. 13 illustrates an exemplary display on the verification-by-division window 31 (FIG. 1) in the second verification-by-division. The control flow at the division point 34 is displayed under a display "Correct Flow Point (before 26)". The division point and the instruction which is present at the division point are displayed under a display "Division Point (before 34)". Further, the variable influencing the error and the value of this variable at the division point 34 are displayed under a display "Flow Data". Referring to FIG. 13, the division point is taken in an intermediate stage of the processing for calculating the area of the second triangle in the second verification-by-division. In this case, the value right of the variable class influencing the error is wrong (the correct value is scalene). Therefore, "NG" is selected and the "Confirm" button is clicked. Then, the display on the verification-by-division window 31 in the second verification-by-division changes to that in third verification-by-division.

Figure 14:
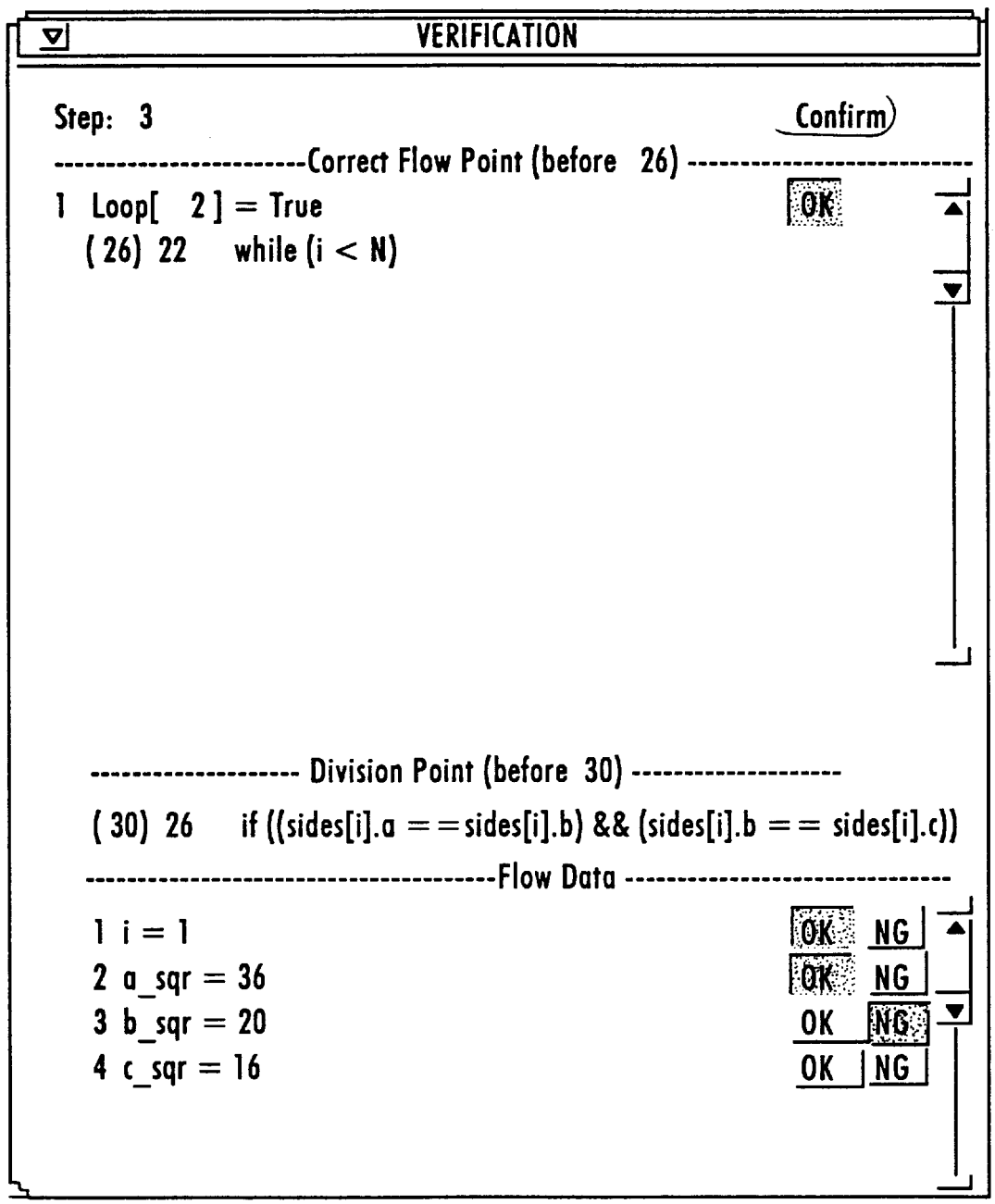
FIG. 14 illustrates an exemplary display on the verification-by-division window (FIG. 1) in third verification-by-division.

FIG. 14 illustrates an exemplary display on the verification-by-division window 31 (FIG. 1) in the third verification-by-division. The control flow at the division point 30 is displayed under a display "Correct Flow Point (before 26)". The division point and the instruction which is present at the division point are displayed under a display "Division Point (before 30)". Further, the variable influencing the error and the value of the variable at the division point 30 are displayed under a display "Flow Data". Referring to FIG. 14, the value 20 of the variable b_sqr influencing the error is wrong (the correct value is 25). Therefore, "NG" is selected and the "Confirm" button is clicked. Then, the display on the verification-by-division window 31 in the third verification-by-division changes to that in fourth verification-by-division. In display on the verification-by-division window 31 in the third verification-by-division, only "OK" is displayed for the control flow, since the control flow has been determined as OK in the first and second verification-by-division.

Figure 15:
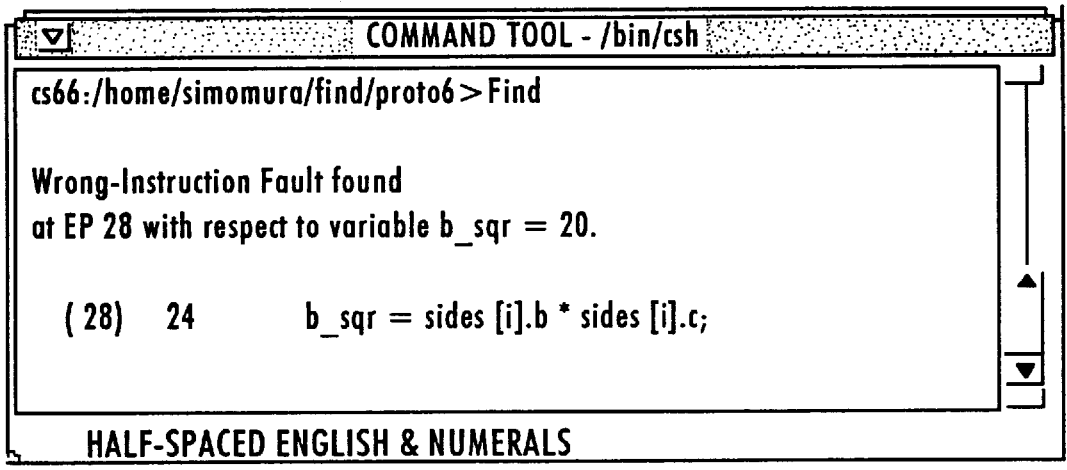
FIG. 15 illustrates an exemplary display on a monitor window (FIG. 1) locating a bug.
Figure 17:
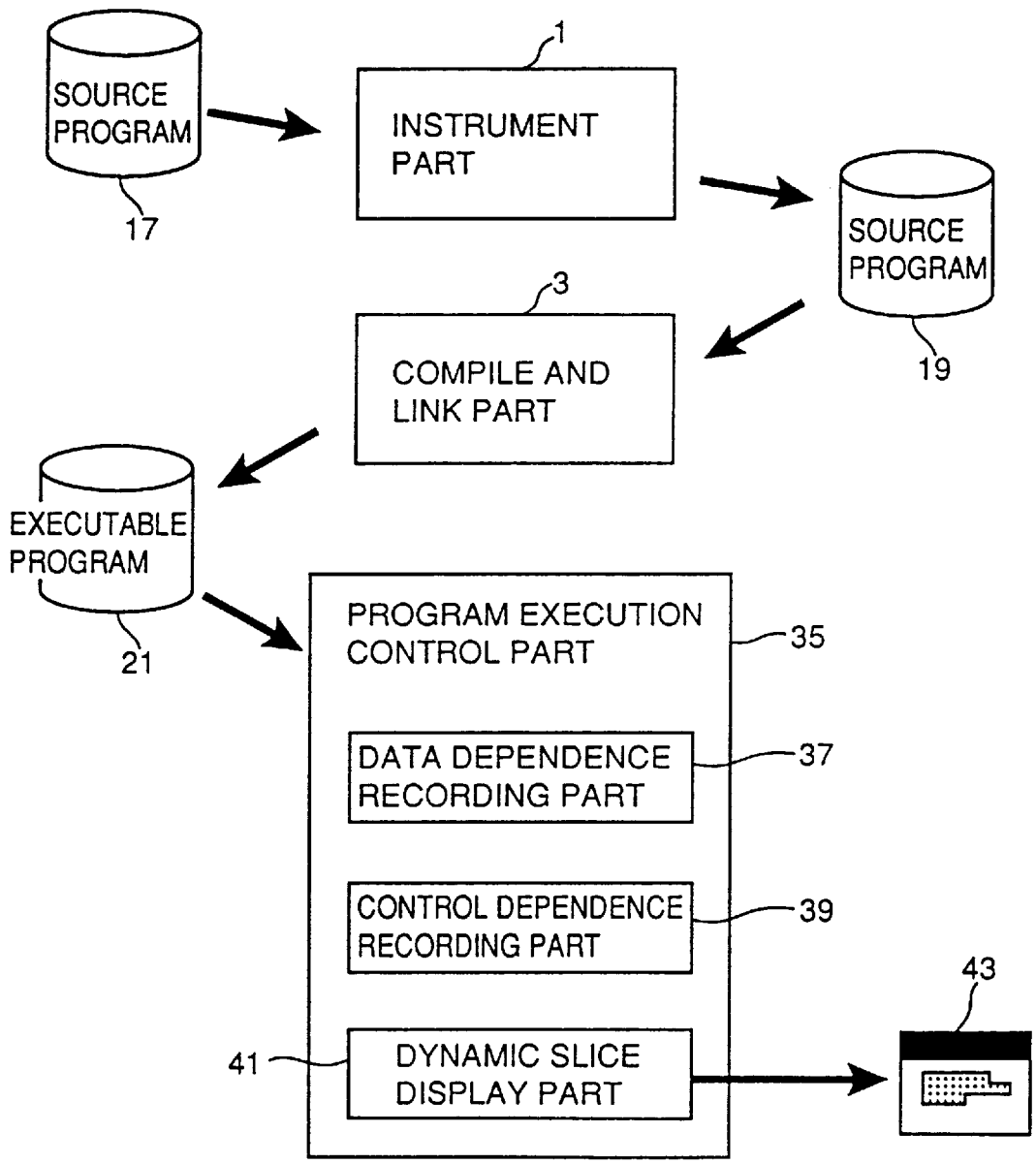
FIG. 17 is a schematic block diagram showing a bug locator utilizing dynamic slicing.

Such verification-by-division is repeated so that the verification-by-division control part 15 automatically locates the assignment instruction of the instruction number 24 as a bug in fifth verification-by-division. FIG. 15 illustrates an exemplary display on the monitor window 33 (FIG. 1) locating the bug. Referring to FIG. 15, the wrong value 13.90 has been displayed on the test window 33 shown in FIG. 9 since the square of the length of the side b has been incorrectly calculated.

FIG. 16 illustrates an exemplary display on the execution sequence window 27 (FIG. 1) in the fourth verification-by-division. Displays identical to those in FIG. 10 have the same meanings. Referring to FIG. 16, it is to be noted that only four instructions are present between the normal and abnormal points. The programmer knows that some bug is necessarily present in this range, and hence can easily the bug before reaching the final step of the verification-by-division.

As hereinabove described, the automatic bug locator according to this embodiment points out the portion of an instruction including a bug or a range having omissive description of instructions by simply repetitively making response as to whether or not control flows or values of variables indicated by the automatic bug locator are correct with "OK" (correct) or "NG" (wrong).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic bug locator for locating a bug in a program being described in a procedural language, comprising:

test control means for causing said program to be executed, letting an operator point out an error from output information from said program, and recording an instruction part being provided with an instruction outputting said error;

program rerun means for causing said program to rerun from an execution start point up to a first instruction part; and dependence analyzing means for causing selection of a third instruction part, between a second instruction part and said first instruction part, for finding an instruction at an instruction part causing transition of control to said third instruction part and a result of execution of said instruction while finding a variable influencing said error and a value of said variable at said third instruction part on the basis of a data dependence, a control dependence, a control definition dependence and an omissive condition dependence, in a rerun of said program by said program rerun means, wherein said first instruction part is said instruction part being provided with said instruction outputting said error, and said second instruction part is an instruction part being provided with an instruction executed first in said program, said automatic bug locator further comprising:

verification-by-division control means for enabling said operator to determine whether or not the value of a variable being used in said instruction causing said transition of control is wrong if said result of execution of said instruction causing said transition of control to said third instruction part is wrong while making said operator determine whether or not a value of said variable influencing said error at said third instruction part is wrong if said result of execution of said instruction causing said transition of control to said third instruction part is correct, wherein said instruction part causing said transition of control to said third instruction part is regarded as said first instruction part when said operator determines that the value of said variable being used in said instruction causing said transition of control to said third instruction part is wrong so that said program rerun means and said dependence analyzing means perform processing, said verification-by-division control means determines said instruction causing said transition of control is a bug when said operator determines that the value of said variable being used in said instruction causing said transition of control to said third instruction part is correct, said third instruction part is regarded as said first instruction part when said operator determines that the value of said variable influencing said error at said third instruction part is wrong so that said program rerun means and said dependence analyzing means perform processing, said third instruction part is regarded as said second instruction part when said operator determines that the value of said variable influencing said error at said third instruction part is correct so that said program rerun means and said dependence analyzing means perform processing, processing by said program rerun means, said dependence analyzing means and said verification-by-division control means is repeated so that said verification-by-division control means determines an instruction in an instruction part being finally present between said first and second instruction parts is a bug, processing by said program rerun means, said dependence analyzing means and said verification-by-division control means is subsequently repeated so that said verification-by-division control means determines that a bug related to omission of an instruction is present between said first and second instruction parts if no instruction part having a data dependence, a control dependence, a control definition dependence or an omissive condition dependence on said first instruction part is present between said first and second instruction parts, an instruction part, preceding a certain instruction part and finally defining a variable being used in an instruction being present in said certain instruction part, has a data dependence on said certain instruction part, an instruction part being provided with a conditional instruction or a loop instruction has a control dependence on a certain instruction part in the branch of said condition instruction or the loop of said loop instruction, an instruction part being provided with a conditional instruction or a loop instruction has a control definition dependence on a certain instruction part when an instruction part, preceding said certain instruction part and finally defining a variable being used in an instruction being present in said certain instruction part, is included in the branch of said conditional instruction or the loop of said loop instruction and said certain instruction part is present outside the branch of said conditional instruction or the loop of said loop instruction, and an instruction part being provided with a conditional instruction or a loop instruction has an omissive condition dependence on a certain instruction part, provided that an instruction part, preceding said certain instruction part and finally defining a variable used by an instruction being present in said certain instruction part, is present before said conditional instruction or said loop instruction, said variable is defined when a result of execution of said conditional instruction or said loop instruction changes, and said certain instruction part is present outside the branch of said conditional instruction or the loop of said loop instruction.

* * * * *